United States Patent [19]

Foley

[11] Patent Number: 5,211,133
[45] Date of Patent: May 18, 1993

[54] LITTER SAVER DEVICE

[76] Inventor: James F. Foley, 812 Grant St., Reynoldsville, Pa. 15851

[21] Appl. No.: 826,814

[22] Filed: Jan. 28, 1992

[51] Int. Cl.$^5$ .............................................. A01K 1/01
[52] U.S. Cl. ..................................... 119/166; 119/165
[58] Field of Search ................. 119/165, 166, 167, 168

[56] References Cited

U.S. PATENT DOCUMENTS

| 2,971,493 | 2/1961 | Robb | 119/166 |
|---|---|---|---|
| 3,476,083 | 11/1969 | Vander Wall | 119/166 |
| 3,796,188 | 3/1974 | Bradstreet | 119/166 |
| 4,444,148 | 4/1984 | Lander | 119/166 |
| 4,771,731 | 9/1988 | Derx et al. | 119/166 |
| 4,802,442 | 2/1989 | Wilson | 119/166 |
| 4,817,560 | 4/1989 | Prince et al. | 119/166 |

Primary Examiner—John G. Weiss
Attorney, Agent, or Firm—George C. Atwell

[57] ABSTRACT

For the collection and disposal of animal excrement, and especially for the collection and disposal of excrement of cats kept as indoor house pets, a litter saver device is provided for removable placement in a cat litter box. The litter saver device includes a box-like insert disposed within the bottom portion of the litter box, a pair of contiguously-aligned screens placed within the box-like insert and supported by inwardly-extending tabs, the screens adapted for supporting thereon a layer of granular material and the cat during performance of excretory functions. In an alternate embodiment, the litter saver device includes a perforated floor member integrally attached to the box-like insert adjacent a peripheral bottom edge of the insert, and a lock ring for securing a screen member beneath and contiguous to the floor member adjacent the bottom edge of the insert.

3 Claims, 4 Drawing Sheets

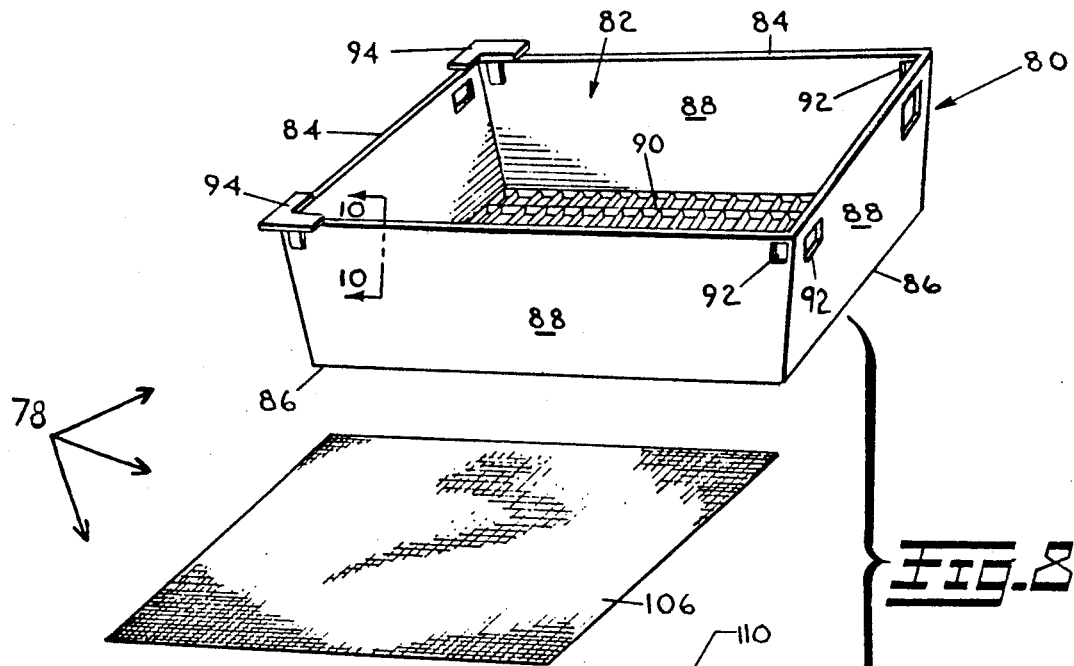
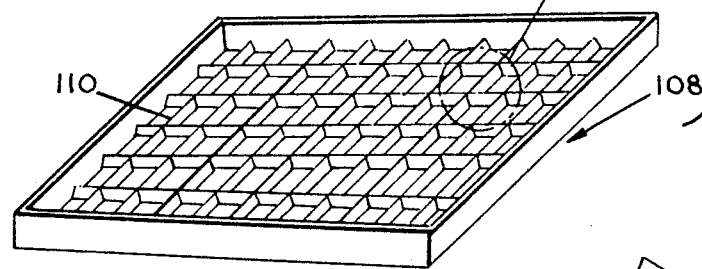
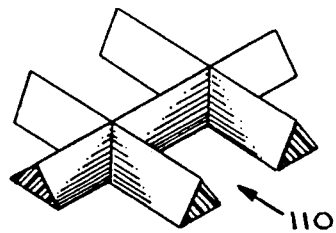
Fig.8
Fig.11
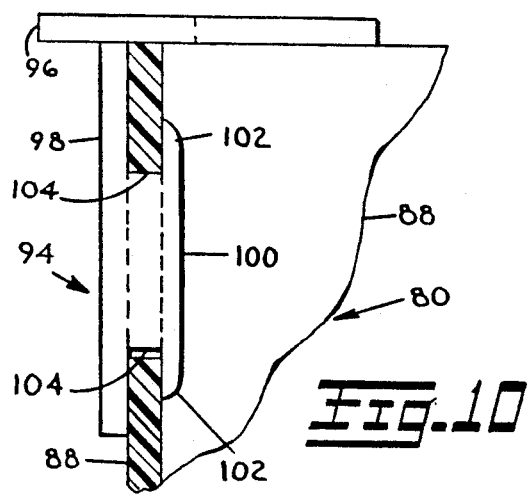
Fig.10
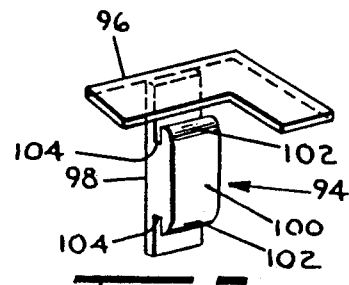
Fig.9

LITTER SAVER DEVICE

BACKGROUND OF THE INVENTION

The present invention relates to devices for the collection and disposal of animal excrement, and more particularly pertains to a litter saver device which is adapted for removable placement within a cat litter box to collect cat excrement in granular material spread within the litter saver device and to permit simple and easy disposal therefrom.

One of the most unpleasant aspects of owning a cat as an indoor housepet is changing the cat litter box. Normally, cat litter is heaped in the bottom portion of a cat litter box, and the cat performs its excretory functions while standing on the cat litter. The urine soaks into the cat litter and the cat buries the excrement beneath the surface of the litter. Within a short time period, noxious odors emanate from the litter box as a result of the ongoing putrefaction of the urine and excrement. Normally, the litter box may have to be changed several times per week as the cat owner attempts to scoop out as much excrement as possible in order to save as much litter as possible and extend its effective life. Over the lifespan of a single cat the owner has a considerable investment in the time required to continually change and clean the litter box and in the money spent continually buying bags of litter for the cat litter box.

A number of different devices are used for the collection and disposal of cat excreta. Some devices employ a system whereby excrement is deposited on a platform or cover and the urine is directed through an opening or orifice to a urine container or receptacle located beneath the opening or orifice. Such devices require a number of structural elements which must be regularly taken apart and cleaned. Other devices include a system whereby a layer of non-absorbent, moisture-impervious granular material is placed over a lower layer or collecting tray which absorbs or collects the urine.

However, there remains a need for a cat litter device which can be used with existing litter boxes and does not require a number of interfitting parts each performing a separate function. The typical litter device is a stand-alone unit that is not adapted for use in cat litter boxes sold in pet stores and department stores. In addition, there is a need for a litter device which is easy to clean, extends the effective life of the cat litter, and which requires use of a minimum amount of cat litter.

SUMMARY OF THE INVENTION

The present invention comprehends a litter saver device for the collection and disposal of animal excrement, and especially applies to the collection and disposal of cat excrement (urine and solid waste matter).

The litter saver device is adapted for removable placement within a cat litter box, and, more specifically, is placed within and supported by the cat litter box so that the cat can enter the litter box through the opening in the box-like cover and deposit its excrement while standing on the litter saver device.

The litter saver device of the present invention includes a generally box-like insert having an open bottom and open top for placement within the litter box. The box-like insert can be square or rectangular-shaped, and includes four slightly-angled walls forming a continuous peripheral upper edge and a continuous peripheral bottom edge. The bottom of the litter box may be filled with a neutralizing agent, such as vinegar, and, when the litter saver device is placed within the litter box, there is a one to one and one-half-inch clearance between the surface of the vinegar and the bottom edge of the insert.

When disposed in its operative position, the box-like insert is flush with, and supported by, the upper peripheral rim of the litter box. The box-like insert includes two pairs of laterally-extending support tabs, with each pair of support tabs attached to the upper edge of oppositely-disposed walls of the insert. The support tabs resting on the upper rim of the litter box also provide clearance between the walls of the insert and the litter box. In addition, a pair of spaced-apart inwardly-extending bottom support tabs are attached to the bottom edge of two walls, oppositely-disposed one to the other.

For placing and removing the litter saver device in the litter box, a pair of oppositely-disposed handles are provided, with one handle attached to the upper edge of one wall and the other handle attached to the upper edge of the oppositely-disposed wall. Furthermore, the handles are pivotally attached to the upper edge of each respective wall so that the handles can be pivoted to allow the box-like cover to be placed on the litter box.

The litter saver device includes a means for holding and containing granular material within the litter saver device and for collecting solid waste material thereupon. Further, the holding means of the present invention permits urine to seep therethrough for deposition in the neutralizing substance. The holding means is adapted for removable placement within the box-like insert and rests upon the inwardly-extending bottom support tabs. Waste material that has collected on the holding means over a period of time can be disposed therefrom by removing the holding means from the insert and dumping the waste material in a trash bag or garbage can. This also allows replacement of the urine-saturated granular material with fresh granular material. The present invention, however, contemplates that most urine will seep through the granular material for deposition in the neutralizing substance.

The holding means of the present invention includes an upper screen having a diamond-shaped configuration and a lower mesh screen. Both screens can be square or rectangular-shaped to conform to the particular configuration of the box-like insert. The lower mesh screen is placed subjacent and contiguous to the upper screen and both screens are maintained in the aforedescribed manner by metal strips that are pressed onto the edges of both screens. The metal strips can be removed so that both screens can be taken apart and cleaned when necessary. The diamond-shaped upper screen supports the weight of the house cat and a layer of granular material spread thereupon. In addition to the bottom support tabs upon which both screens and the metal strips rest, a bottom support bar transversely extending from the bottom edge of one wall to the bottom edge of the oppositely-disposed wall can be utilized to provide additional support.

It is an objective of the present invention to provide a litter saver device which can fit into cat litter boxes currently being sold.

Another objective of the present invention is to provide a cat litter device which extends the useful life of the granular material so that frequent changes of the granular material can be avoided.

These and other objects of the invention will be apparent from the examination of the following description and drawings.

BRIEF DESCRIPTION OF THE DRAWINGS

FIG. 8 is a front perspective exploded view of yet another alternate embodiment for the litter saver device;

FIG. 9 is an enlarged perspective view of a structural component of the litter saver device first shown in FIG. 8;

FIG. 10 is an enlarged fragmentary cross-sectioned view taken along lines 10—10 of the litter save device first shown in FIG. 8; and FIG. 11 is an enlarged fragmentary view of structural components of the litter saver device first shown in FIG. 8.

DETAILED DESCRIPTION OF THE PREFERRED EMBODIMENT

FIG. 1-3 and 5 illustrate a preferred embodiment of a litter saver device 10 adapted for removable placement within a cat litter box 12. More specifically, the litter saver device 10 rests within the litter box 12 and is covered by the cat litter housing 14, which has an opening for allowing the cat to enter and exit in the performance of its excretory functions. The litter saver device 10 of the present invention extends the useful life of the granular material 16, such as cat litter, placed thereon and in which the cat excrement is deposited. The device 10 also extends the usefulness of the cat litter by having a means for allowing a substantial portion of the cat urine to pass through the cat litter for collection in the litter box 12. Thus, a substantial portion of the cat urine is not absorbed by the cat litter and the useful life of the cat litter is extended. The device 10 is adapted for the collection and disposal of animal waste material in general; although its main use will be for the collection and disposal of cat excreta. The device 10 can be used with any animal trained to stand within the device 10 to perform its excretory functions.

Figure 1:
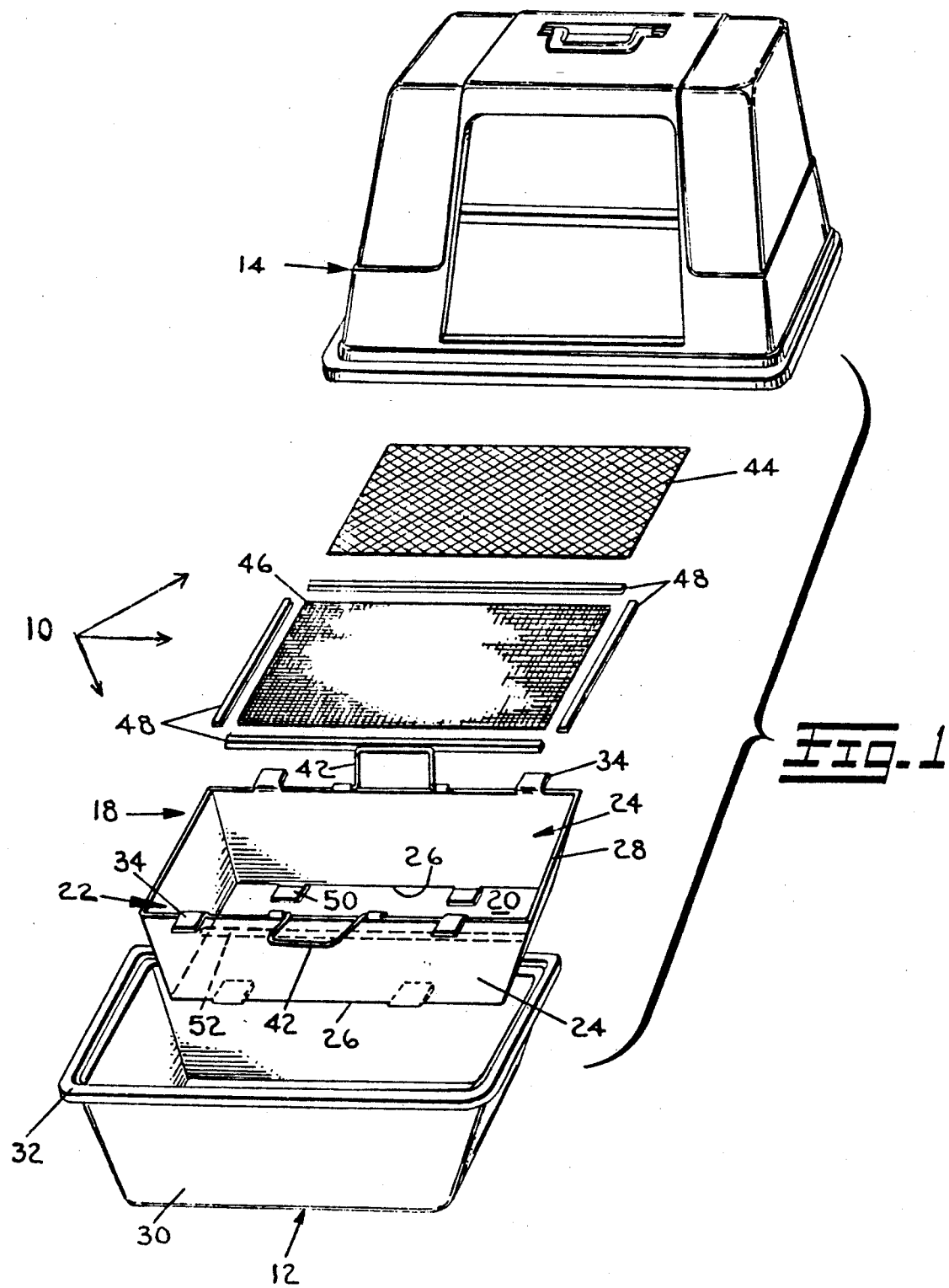
FIG. 1 is a front perspective exploded view of the litter saver device of the present invention showing the structural components prior to assembly and placement in the litter box.
Figure 2:
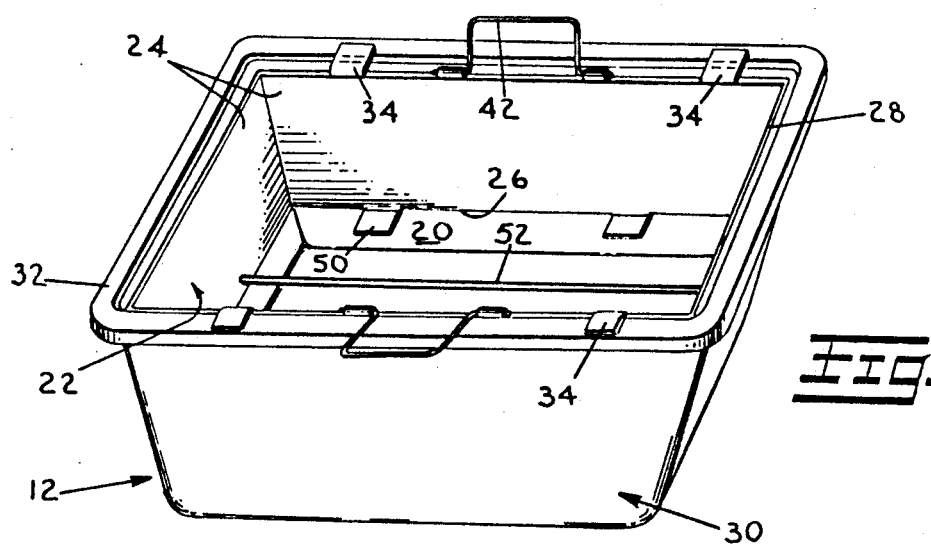
FIG. 2 is a front perspective view of the device first shown in FIG. 1, placed in the litter box.

As shown in FIG. 1 and 2, the device 10 includes a generally box-like insert 18 for placement within the litter box 12. The insert 18 has an open bottom 20 and an open top 22, and can be either square-shaped or rectangular-shaped. In the device 10 of the present invention, the insert 18 is rectangular-shaped to fit the litter box 12. The device 10 may be manufactured from a plastic molding process or fabricated from metal with a powdered metal coating applied thereto. Therefore, the device 10, and more particularly the insert 18, can easily be manufactured to fit the variously sized litter boxes on the market. The insert 18 has four slightly angled walls 24 which form a continuous bottom peripheral edge 26 and a continuous upper edge 28. The walls 24 are inwardly angled, as shown in FIG. 1-5, to conform generally to the downward and inward slope of the four walls 30 of the litter box 12. The walls 30 can be further characterized as two pairs of oppositely-disposed walls 30 with all the walls 30 joined at their long vertical edges to form a continuous rectangular- or square-shaped structure for removable insertion within the litter box 12. When the device 10 is placed within the litter box 12, each angled wall 24 of the insert 18 is adjacent and flush with the continuous upper rim 32 of the litter box 12.

Figure 3:
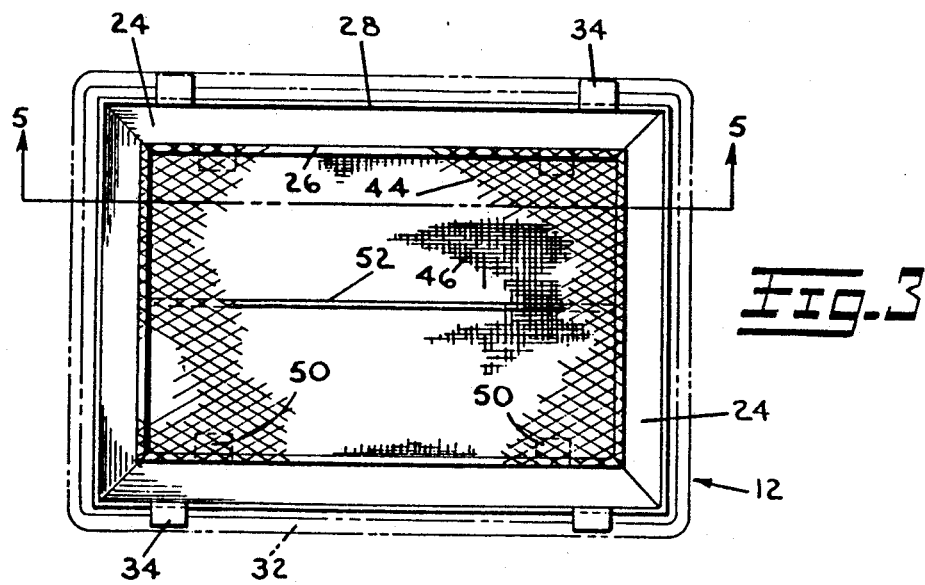
FIG. 3 is a top plan view of the device first shown in FIG. 1.

FIG. 1-5 illustrate a support means for supporting the inset 18 within the litter box 12. The present invention contemplates the use of several types of support means for supporting the device 10 within the litter box 12. FIG. 1-3 illustrate two pairs of laterally-extending support tabs 34 which are connected to the upper edge 28 of two respective and oppositely-disposed angled walls 24 of the insert 18. Each pair of tabs 34 are spaced from one another in their attachment at the upper edge 28 of the respective angled wall 24, with one pair of tabs 34 attached to the upper edge 28 of one angled wall 24 directly across from and aligned with the pair of spaced-apart tabs 34 attached to the upper edge 28 of the oppositely-disposed wall 24. As shown in FIG. 2 and 3, when the device 10 is placed within the litter box 12, with the insert 18 fully set within the litter box 12, the support tabs 34 rest upon the upper rim 32 of the litter box 12 and their horizontal lateral extension provides clearance between the angled walls 30 of the litter box 12 and the angled walls 24 of the insert 18. There may be up to one inch clearance between the angled walls 30 of the litter box 12 and the angled walls 24 of the insert 18, and this is done for purposes of ventilation, as will be explained hereinafter.

Figure 4:
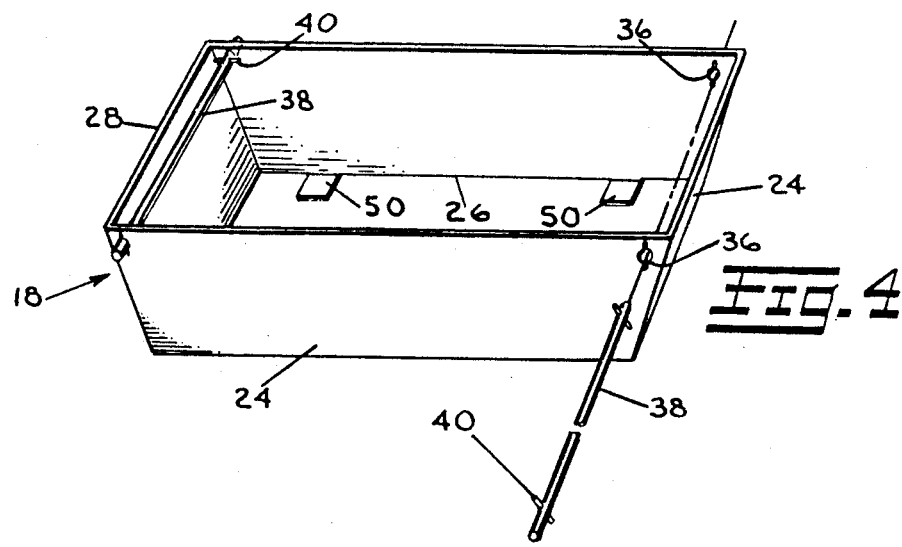
FIG. 4 is a front perspective view of the device first shown in FIG. 1, illustrating several structural components of an alternate embodiment for supporting the device in the litter box.

FIG. 4 illustrates an alternate support means which can be utilized by the device 10 of the present invention. Located adjacent the upper edge 28 of each of a pair of oppositely-disposed angled walls 24 are a pair of spaced-apart through-holes 36. The holes 36 on one wall 24 are axially aligned with the holes 36 on the oppositely-disposed wall 24. In addition, the support means shown in FIG. 4 includes a pair of support bars 38 which are adapted for removable insertion into and through the holes 36. More specifically, each support bar 38 is inserted through one hole 36 in one of the walls 24 and extends into and through the hole 36 located on the oppositely-disposed wall 24. Attached to each end of the support bar 38 are a pair of projecting retaining prongs 40 which are spaced 180° from each other. The holes 36 are shaped to receive the support bars 38 and the retaining prongs 40. Each pair of retaining prongs 40 are inwardly spaced from the ends of the support bars 38 so that when each support bar 38 is inserted into the holes 36 the retaining prongs 40 are adjacent the inside surface of the angled walls 24 when disposed in their operative position. After each support bar 38 is inserted into the insert 18, the retaining prongs 40 are turned 90° so that they abut the inside surface of the walls 24 to prevent linear sliding of the support bars 38. The ends of each support bar 38 project outwardly and horizontally from the walls 24 and, thus, the ends of each support bar 38 rest upon the upper rim 32 of the litter box 12 when the insert 18 is placed therein. The horizontal extension of the ends of the support bars 38 also provides clearance between the walls 24 of the insert 18 and the walls 30 of the litter box 12 for the purposes of ventilation.

As shown in FIG. 1 and 2, the device 10 includes a pair of oppositely-disposed handles 42 utilized for placing the device 10 within the litter box 12 and for removing it therefrom when necessary. Each handle 42 is pivotally attached to the upper edge 28 of respective and oppositely-disposed walls 24. The handles 42 pivotally attach to the upper edge 28 of each respective wall 24 so that they can be pivoted out of the road in order to place the cover 14 on the litter box 12.

The device 10 of the present invention includes a means for holding the granular material 16, such as cat litter or washable and reusable plastic-coated stones, within the insert 18 and upon which waste material is deposited. A holding means is adapted for removable placement within the insert 18 so that waste material can be collected thereon and disposed therefrom in an easy and efficient manner, and also so that the granular material 16 within which the excrement is deposited and which partially absorbs some of the urine can be replaced as needed.

Figure 5:
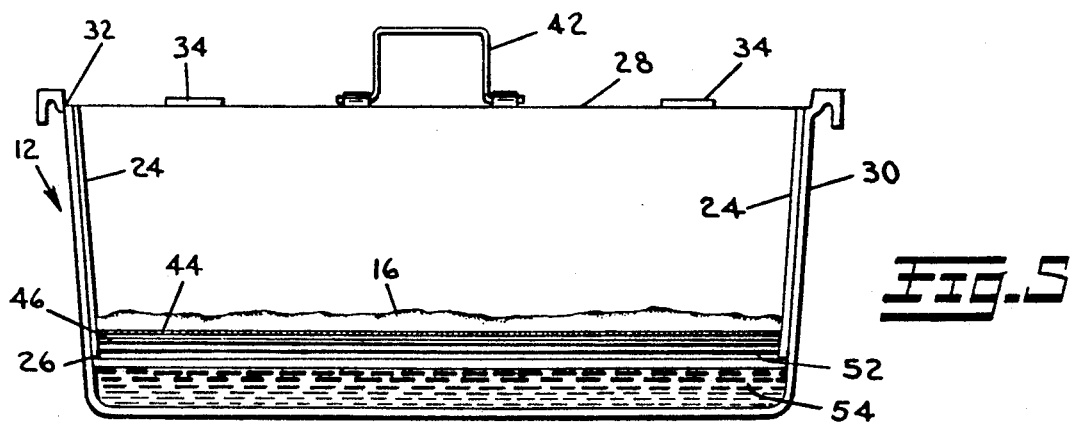
FIG. 5 is a transverse, vertical sectional view of the litter saver device taken along lien 5—5 of FIG. 3.

As shown in FIG. 1, 3, and 5, the holding means includes a pair of screens placed within the insert 18 adjacent the continuous bottom peripheral edge 26. More specifically, the pair of screens includes a upper screen 44 having a diamond-shaped configuration and a lower screen 46 which is disposed subjacent and contiguous to the upper screen 44 when both screens are disposed within the insert 18. The lower screen 46 can be an aluminum or nylon fine mesh screen. A fastening means is utilized to hold the upper screen 44 and the lower screen 46 in contiguous alignment when both screen are disposed in their operative positions. The fastening means includes four metal strips 48, each of which has an interior longitudinal groove or recess. In assembly, the upper screen 44 and the lower screen 46 are placed in contiguous alignment and then the metal strips 48 are slipped onto both screens 44 and 46 with the peripheral edges of both screens 44 and 46 pressed into the longitudinal grooves of the metal strips 48. The diamond-shaped upper screen 44 may be constructed from a molded plastic, such as plexiglass, with the apertures for the diamond configuration punched therethrough. The diamond-shaped upper screen 44 manufactured from metal would have a tendency to corrode due to chemical reactions occurring as a result of the urine contacting the metal-formed upper screen 44.

FIG. 1, 2, 3, and 4 illustrate a plurality of inwardly-extending, horizontally-disposed, spaced-apart bottom support tabs 50. Specifically, one pair of bottom support tabs 50 are attached to the bottom edge 26 of one of the walls 24 and the second pair of bottom support tabs 50 are attached to the bottom edge 26 of an oppositely-disposed wall 24. Each pair of tabs 50 are spaced from each other, and the tabs 50 connected to the bottom edge 26 of one wall 24 are located directly across from the tabs 50 attached to the bottom edge 26 of the opposite wall 24. The holding means comprising the upper screen 44, the lower screen 46 disposed subjacent and contiguous thereto, and the fastening means comprising the metal strips 48 for holding the two screens 44 and 46 in contiguous alignment, is placed within the insert 18 for resting upon and supporting by the tabs 50. The tabs 50 extend far enough into the open bottom 20 to prevent the holding means from slipping or sliding off and falling into the litter floor of the litter box 12. For additional support, a reinforcing bar 52, as shown in FIG. 2 and 3, can be utilized. The reinforcing bar 52 would extend across the open bottom 20 of the insert 18 transverse to the location of each pair of support tabs 50. The reinforcing bar 52 would prevent sagging caused by the weight of the granular material 16 and a cat standing in the middle portion of the upper screen 44 for long periods of time. However, it is anticipated that the upper screen 44 manufactured from molded plastic, such as plexiglass, will easily sustain the weight of a common housecat, and the tabs 50 will provide the necessary support for the holding means (the upper screen 44, the lower screen 46, and the metal strips 48 holding the screens in alignment).

As shown in FIG. 5, a neutralizing agent 54, such as white vinegar, may be placed within the litter floor of the litter box 12 to a depth of between one-half to one inch. The neutralizing agent 54 is used to kill the powerful and acrid smell of the urine that seeps through the cat litter and the screens 44 and 46. The insert 18, when disposed within the litter box 12, will sit approximately two inches from the litter floor of the litter box 12. This will provide at least one inch clearance between the surface of the neutralizing agent 54 and the peripheral bottom edge 26 of the insert 18, thus providing additional ventilation. It should be noted that these dimensions are given by way of example; the dimensions of the device 10 can be manufactured to conform to litter boxes of a variety of sizes and, therefore, the clearance between the walls 24 of the insert 18 and the walls 30 of the litter box 12 as well as the clearance between the floor of the litter box 12 and the peripheral bottom edge 26 of the insert 18 will accordingly change. A layer of granular material 16, such as cat litter, just several inches thick is all that is needed to be deposited on the upper screen 44.

In order to prepare the device 10 for use, the first step is to fill the floor of the litter box 12 with the aforementioned white vinegar (neutralizing agent 54). The holding means is then securely assembled with the metal strips 48 firmly placed about the perimeter edges of both the upper screen 44 and the lower screen 46 to hold them in contiguous alignment, and then the upper screen 44 and lower screen 46, forming a single unit, are placed within the insert 18 and rest upon and are supported by the tabs 50. The device 10 is then placed into the litter box 12 by using the handles 42 for grasping and placing the device 10 within the litter box 12. The laterally-extending tabs 34 rest upon the upper peripheral rim 32 of the litter box 12 and support the device 10 within the litter box 12. A layer of the granular material 16, such as cat litter, is spread on the upper screen 44 and is prevented from falling through the apertures of the diamondshaped upper screen 44 by the mesh lower screen 46 subjacent thereto. The box-shaped covering 14 is then placed on the litter box 12, and the device 10 is then ready for use.

Whenever the user feels it is necessary to remove the cat litter and replace it with fresh cat litter, and to replace the neutralizing agent with fresh neutralizing agent, he can do so easily and quickly. It has been found that cat litter will maintain its usefulness for several months at a time when used with the device 10 of the present invention. The various structural components of the device 10 can be easily disassembled and cleaned when necessary, and the litter box 12 itself can be easily rinsed out when necessary. The clearance between the walls 24 of the insert 18 and the walls 30 of the box 12 provide ventilation for the device 10. Without this ventilation, moisture from the cat urine accumulating in the neutralizing agent 54 would increase and be slowly absorbed by the litter, thus decreasing the useful life of the litter.

Figure 7:
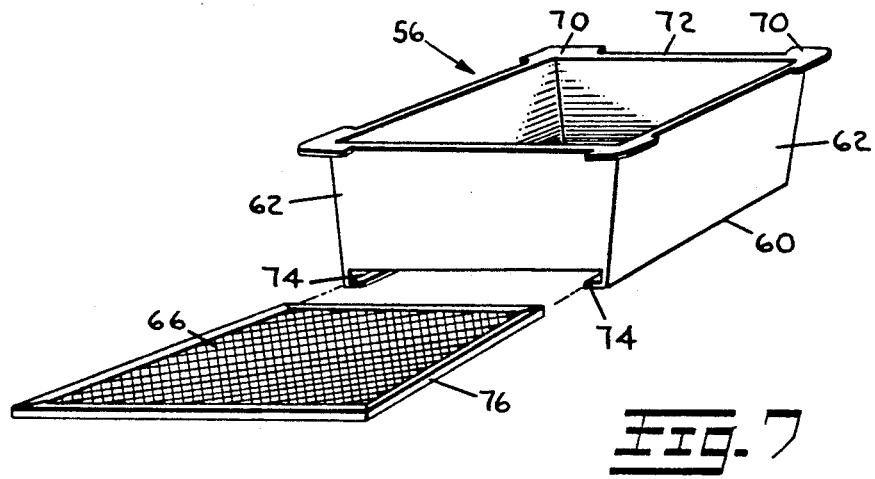
FIG. 7 is a perspective view of the litter save device shown in FIG. 6, illustrating an alternate embodiment for attaching the screen member to the litter saver device.
Figure 6:
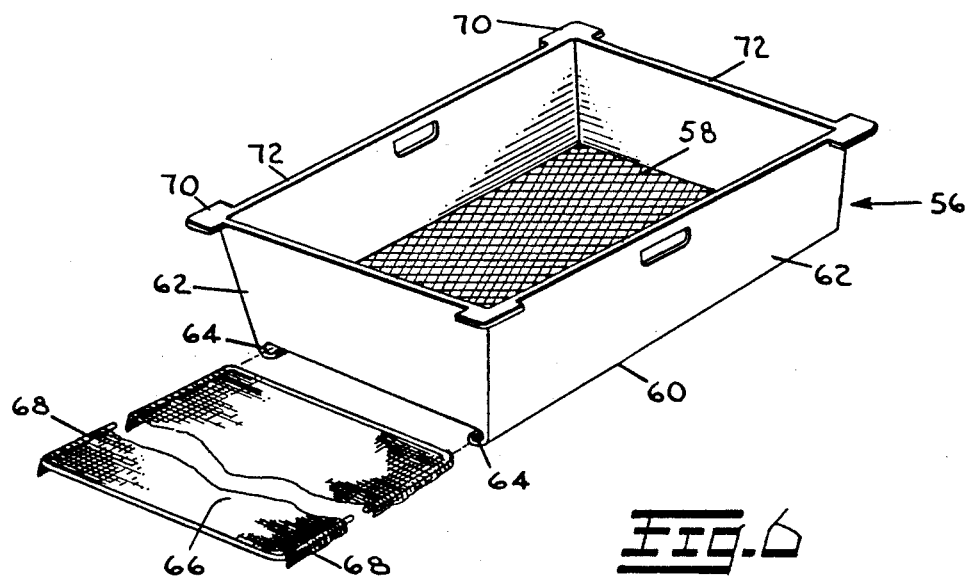
FIG. 6 is a perspective view of an alternate embodiment of the invention.

FIG. 6 and 7 illustrate alternate embodiments for the litter saver device. In FIG. 6 a litter saver device 56 is shown with a diamond-shaped upper screen 58 that is integrally attached to a peripheral bottom edge 60 formed by a plurality of angled walls 62. Two of the walls 62, oppositely disposed to each other, include an integrally formed longitudinal recess 64 extending along the length of the bottom peripheral edge 62. A lower mesh screen 66 is bounded on all four sides by a retaining strip 68. In order to attach the lower mesh screen 66 to the device 56, the lower mesh screen 66 is simply aligned with the ends of each respective longitudinal groove 64 and then the screen 66 is slid therein with the retaining strips 68 having the flexibility to permit the easy insertion of the lower mesh screen 66 fully into each respective longitudinal groove 64. When the lower mesh screen 66 is disposed in its operative position, it will be subjacent and aligned with the diamond-shaped upper screen 58.

In addition, FIG. 6 illustrates an alternate support means for supporting the device 56 within the litter box 12. Instead of the laterally-extending support tabs 34 illustrated in FIG. 1-3, FIG. 6 shows a plurality of integrally attached corner support tabs 70. Each corner support tab 70 is located at the respective corners of the device 56 and extends laterally and horizontally therefrom. The corner support tabs 70 are attached adjacent a continuous peripheral upper edge 72 at each of the corners of the angled walls 62. When the device 56 is placed within the litter box 12, each corner support tab 70 will project outwardly therefrom and will rest upon the upper rim 32 of the litter box 12 at the corners thereof.

FIG. 7 illustrates an alternate embodiment of the longitudinal grooves for receiving the lower mesh screen 66 of FIG. 6. In FIG. 7 a pair of spaced-apart oppositely-disposed longitudinal grooves 74 located adjacent the peripheral bottom edge 60 of respective oppositely-disposed angled walls 62 is shown. The grooves 74 of FIG. 7 are square-shaped in contrast to the circular-shaped longitudinal grooves 64 shown in FIG. 6. The lower mesh screen 66 is bounded at its periphery by a firm metal strip 76 which is attached to the lower screen 66. Before the device 56 is placed within the litter box 12, the lower mesh screen 66 is simply aligned with each respective square-shaped groove 74 and then it is slid therein until the metal strip 76 is fully contained within each respective longitudinal groove 74. The lower mesh screen 66 will then be aligned with and subjacent to the integrally formed diamond-shaped upper screen 58, and then the device 56 can be placed within the litter box 12.

FIG. 8-11 illustrates a fourth alternate embodiment for the litter saver device of the present invention. A litter saver device 78 is shown in FIG. 8 for the collection and disposal of animal waste material and is adapted for removable placement in the litter box 12, as shown in FIG. 1 and 2. The litter box 12 will be of the same general type as described in the preferred embodiment, and will include the inwardly-sloped and angled sidewalls and the box-like covering 14 with an opening cut in one side for the animal to enter and exit therethrough. The device 78 shown in FIG. 8 includes a box-like insert 80 for placement within the litter box 12. The insert 80 has an open top 82, a continuous and peripheral upper edge 84, and a continuous and peripheral bottom edge 86. The insert 80 will also include four inwardly-sloped and angled walls 88 and a perforated floor member 90 integrally attached to the insert 80 adjacent the peripheral bottom edge 86. The floor member 90 will have a grid-shaped form, as shown in FIG. 8, or a diamond-shaped configuration and can be constructed preferably from plexiglas. Granular material 16, such as cat litter, will be spread upon the floor member 90 so that waste material can be deposited on and collected by the cat litter. The sloped walls 88 of the insert 80 will conform generally to the sloped walls 30 of the litter box 12, and the general shape and configuration of the insert 80 will be adapted to conform to the general shape and configuration of litter boxes of various sizes as are found on the market. When the insert 80 is placed within the litter box 12, the peripheral upper edge 84 will be flush with the peripheral upper rim 32 of the litter box 12.

As shown in FIG. 8, the walls 88 will have a pair of spaced-apart apertures 92 located thereon adjacent the peripheral upper edge 84 of each respective wall 88. The spaced-apart apertures 92 of one wall 88 will be aligned with the spaced apart apertures 92 located on the oppositely-disposed wall 88. A plurality of corner support members 94 will be adapted for removable attachment to the insert 80, with one corner support member 94 being removably attachable to each respective aperture 92. The apertures 92 are located adjacent the corners of the insert 80 so that when the corner support members 94 are attached to the insert 80, and the insert 80 is placed within the litter box 12, each corner support member 94 will rest upon the upper rim 32 of the litter box 12 adjacent the corners of the litter box 12.

As shown in FIG. 9, each corner support member 94 includes a flat, horizontally-disposed, right-angled upper member 96 which is integrally attached and formed to a vertically-extending attachment member 98. The vertical attachment member 98 includes an integrally formed, rectangular-shaped, flexible snap-on portion 100 which is pressed into the aperture 92. The snap-on portion 100 is shorter than the vertical attachment member 98 and includes, at each opposite end, a projecting flange 102 and a horizontal groove 104 coextensive with the width of the snap-on portion 100 and the vertical attachment member 98. When the corner support member 94 is attached to the insert 80, the snap-on portion 100 is pressed into the aperture 92 so that the portions of the wall 88 which horizontally bound the aperture 92 are firmly received within each respective groove 104.

FIG. 10 illustrates that when the corner support member 94 is attached to the insert 80, the vertical attachment member 98 is firmly pressed contiguous to the outer surface of the wall 88 adjacent the aperture 92 and each projecting flange 102 of the snap-on portion 100 is flexibly pressed through the aperture 92 so the flanges 102 are contiguous to the inner surface of the wall 88. Each horizontal groove 104 receives that portion of the wall 88 that horizontally bounds the respective aperture 92. A firm attachment of the corner support member 94 is achieved, yet each corner support member 94 can be removed from the insert 80 due to the flexible plastic or rubber flanges 102.

As shown in FIG. 8, the device 78 includes a screen member 106 which is disposed subjacent and contiguous to the floor member 90. The screen member 106 is a fine mesh aluminum or nylon screen, either square-shaped or rectangular-shaped in order to conform to the dimensions of the insert 80, and which is adapted for removable securement to the floor member adjacent the peripheral bottom edge 86. A lock ring 108 is employed for securing the screen member 106 contiguous and subjacent to the floor member 90 when the device 78 is disposed in its operative position within the litter box 12. The lock ring 108 fits over the screen member 106 and is adapted for wedging it against the floor member 90 and the peripheral bottom edge 86 of the insert 80.

In order to attach the screen member 106, as shown in FIG. 8, to the insert 80 contiguous to the floor member 90, the first step is simply to turn the insert 80, with the corner support members 94 either attached or not yet attached, upside down and place the insert 80 on a level surface. Next, the screen member 106 is placed on the floor member 90 so that it is contiguous and generally aligned therewith. Then, the lock ring 108 is pressed onto the screen 106 and wedged against the bottom peripheral edge 86 of the insert 80 and the lower portions of each wall 88, thus, firmly pressing the screen member 106 to the floor member 90 and tightly wedging the lock ring 108 to the insert 80. If there is a peripheral portion of the screen member 106 which overhangs the lock ring 108, it can be easily trimmed off. As shown in FIG. 8 and 11, the lock ring 108 includes a plurality of tapered, longitudinal support members 110 which form a grid within the lock ring 108. In addition, the frame of the lock ring 108 has a vertical extension for allowing the tapered, longitudinal support members 110 to set within the lock ring 108. The longitudinal support members 110 facilitate the flat and generally parallel securement of the screen member 106 to the floor member 90 by pressing against the screen member 90 so that a contiguous fit of the screen member 106 to the floor member 90 without sagging is achieved. In order to clean the screen member 106, the lock ring 108 is simply pulled off of its securement to the insert 80 and then the screen member 106 can be taken off and cleaned or replaced as needed.

While the litter saver device of the present invention has been described in detail with respect to a specific preferred embodiment and alternate embodiments thereof, it will be apparent to one skilled in the art that numerous variations may be made to such embodiments without departing from the spirit and scope of the invention.

I claim:

1. For the collection and disposal of animal waste material a litter saver device is adapted for removable placement in a litter box having a litter floor and an upper rim, the litter saver device comprising:
    a generally box-like insert for placement within the litter box, the box-like insert having an open top and a peripheral bottom edge;
    a perforated floor member integrally attached to the box-like inset adjacent the bottom edge, the floor member for receiving granular material spread thereupon so that deposited waste material can be collected by the granular material;
    a screen member disposed subjacent and contiguous to the floor member, the screen member adapted for removable securement to the floor member adjacent the bottom edge of the box-like insert;
    a lock ring for securing the screen member contiguous to the floor member, the lock ring adapted for pressing the screen member against the floor member and wedging against the bottom edge of the insert; and
    the lock ring further including a plurality of tapered longitudinal support members forming a grid within the lock ring for further securing the screen member contiguous to the floor member.

2. For the collection and disposal of animal waste material, a litter saver device adapted for removable placement in a litter box and having a litter floor and an upper rim, comprising:
    a generally box-like insert for placement within the litter box, the box-like insert having an open top and a peripheral bottom edge formed by a plurality of angled walls;
    a plurality of laterally-extending, corner support tabs with each tab attached to the box-like insert adjacent the open top for resting upon the upper rim of the litter box and supporting the box-like insert disposed therein;
    means for holding granular material within the box-like insert and upon which waste material is deposited;
    the holding means including a diamond-shaped upper screen integrally attached to the box-like insert adjacent the bottom edge, the upper screen for receiving granular material spread thereupon so that deposited waste material can be collected by the granular material;
    a pair of spaced-apart longitudinal grooves with each groove located adjacent and below one of the plurality of angled walls; and
    a lower mesh screen adapted for removable insertion into the longitudinal grooves so that the lower mesh screen when disposed in its operative position is subjacent and in alignment with the upper screen.

3. For the collection and disposal of animal waste material, a litter saver device adapted for removable placement in a litter box having a litter floor and an upper rim, the litter saver device comprising:
    a generally box-like insert adapted for removable placement within the litter box, the box-like insert including four slightly angled walls, a peripheral bottom edge, an open top, and an open bottom;
    means for holding granular material within the box-like insert and upon which waste material is deposited;
    the holding means being adapted for removable placement within the box-like insert so that waste material can be collected and disposed therefrom and granular material can be replaced thereon;
    at least two pairs of inwardly-extending bottom support tabs, with one pair of support tabs attached to the bottom peripheral edge of the oppositely-disposed angled wall for supporting the holding means;
    the angled walls further defining a continuous upper edge which is adjacent and flush with the upper rim of the litter box when the box-like insert is placed within the litter box;
    at least one pair of oppositely-disposed angled walls, each having at least one pair of spaced-apart through-holes adjacent the upper edge of each respective wall, the pair of through-holes of one angled wall aligned with the pair of through-holes on the oppositely-disposed angled wall; and at least one pair of support bars with each support bar adapted for removable insertion into one hole on one angled wall and through the respectively aligned through-hole of the oppositely-disposed wall so that the ends of each support bar rest on the upper rim of the litter box for providing clearance between the angled walls and the litter box.

* * * * *